United States Patent [19]
Lipp

[11] 3,709,586
[45] Jan. 9, 1973

[54] METHOD OF MAKING AN ELECTRO-OPTIC SWITCH

[75] Inventor: James Lipp, Poughkeepsie, N.Y.

[73] Assignee: International Business Machines Corporation, Armonk, N.Y.

[22] Filed: Nov. 2, 1970

[21] Appl. No.: 86,209

[52] U.S. Cl. ............... 350/320, 350/150, 350/160
[51] Int. Cl. ............................................. G02f 1/26
[58] Field of Search .............. 350/150, 160, 320, 321; 29/25.15

[56] References Cited

UNITED STATES PATENTS

| | | | |
|---|---|---|---|
| 2,793,148 | 5/1957 | West | 350/150 X |
| 2,429,420 | 10/1947 | McMaster | 350/150 |
| 3,257,903 | 6/1966 | Marks | 350/150 |
| 2,467,325 | 4/1949 | Mason | 350/150 |
| 2,649,027 | 8/1953 | Mason | 350/150 |
| 2,649,507 | 8/1953 | Dressler et al. | 350/150 |
| 2,780,958 | 2/1957 | Wiley | 350/150 |
| 3,245,315 | 4/1966 | Marks et al. | 350/150 |

Primary Examiner—David Schonberg
Assistant Examiner—Paul R. Miller
Attorney—Hanifin and Jancin and John F. Osterndorf

[57] ABSTRACT

A method of fabricating electro-optic switches for use in high speed applications. Transparent conductive electrodes are affixed to a substrate and then directly applied to the surfaces of an electro-optic crystal using an optical cement. Affixing of the electrodes to the crystal is performed while pressure, having a predetermined relationship to the crystal size, is exerted on the entire package. An optical cement is also described having very low electrical resistance and very high optical transmissivity. The cement is unbalanced by an ionic carrier to enhance the ionic conductivity between the electrodes.

8 Claims, 3 Drawing Figures

PATENTED JAN 9 1973 3,709,586

INVENTOR
JAMES LIPP

John F. Osterndorf
BY
ATTORNEY 3,709,586

METHOD OF MAKING AN ELECTRO-OPTIC SWITCH

BACKGROUND OF THE INVENTION

1. Field of the Invention

This invention relates to the fabrication of electro-optic switches and more particularly to the method of applying electrodes to electro-optic crystals and the cement employed in the fabrication method.

2. Description of the Prior Art

As is well known, many optical systems, such as the printer or display of U.S. Pat. No. Re 26,170, require that the polarization state of a light beam be controlled and rotated to accomplish the functioning of the system. Electro-optic switches provide one means for performing the selective rotation of the polarization state of a light beam. When employed in digital light deflection systems of the type described and claimed in U.S. Pat. Nos. 3,499,700 and 3,353,894, the switches effect a selective 90° rotation in the polarization state between orthogonally displaced linear polarization states when a selected voltage is applied across their electrodes. The required voltage for performing this rotation is a function of the crystal material, the wavelength of light to be polarization rotated and the characteristics of the electrodes. For a potassium dideuterium phosphate ($KD_2PO_4$ or $KD^*P$) crystal, the voltage applied between the electrodes ranges between 3,000 and 5,000 volts for light in the visible portion of the spectrum.

To fabricate a switch, a crystal must have transparent electrodes formed on selected ones of its surfaces. In the case of a light deflector, at least one electro-optic switch is arranged in each of a plurality of cascaded light deflection stages. Very high transparency must be achieved through the electrodes as well as through the crystals of these stages. At the same time, the electrodes are required to be good electrical conductors for switching the applied voltage on and off in high speed manner (at least $10^9$ CPS).

Presently, electrodes with low electrical resistance less than 100 ohms and 95 percent or greater transmission of the incident light, cannot be formed directly on a $KD^*P$ crystal for use in high speed switching applications. Therefore, electrodes of tin oxide which are melted or deposited upon quartz substrates are fastened to the $KD^*P$ crystal. The crystal surface and electrode surfaces are not flat enough to completely contact each other without small air gaps forming between them. When polarization rotation switching voltages are applied to the electrodes, an electrical breakdown occurs across these gaps destroying the crystal and requiring replacement of the electro-optic switches.

It has been suggested that an electro-optical switch be formed with a quartz overcoating on a potassium dihydrogen phosphate (KDP) crystal to resolve the electrode-KDP crystal bonding problem. However, there has been no suggestion of using a conductive cement for fastening the electrodes to the surfaces of the crystal. A switch arrangement has been described in the IBM, Technical Disclosure Bulletin, Mar. 1967 at page 1383. Transparent conductive layers are vacuum deposited on the insulator film for serving as the electrodes. This arrangement does not allow for the direct application of the electrical field across the crystal but does result in an added capacitive effect in switch operation.

It has been determined that the electrodes should be affixed to the crystal surface in a sandwich form using a conductive cement to avoid any problems of electrical breakdown. Certain conductive cements for use in forming electrodes on electro-optical crystals are described in Optical and Electro-Optical Information Processing, Chapter 23 at pages 409–415. However, as is emphasized on page 415 of this reference, these cements produce results that are only valid at the very low switching speeds for the electro-optical switches. The cement layers act as capacitors and cannot be used for switching applications in the high speed range required for light deflectors used in data processing apparatus.

SUMMARY OF THE INVENTION

As contrasted with the prior art, this invention is concerned with a particular method of applying the electrodes for an electro-optic switch directly to the surface of an electro-optic crystal. The switch must be capable of switching at very high speeds with a large optical aperture required for convergent digital light deflection applications. To accomplish this switching objective, this invention is also concerned with a new conductive cement that is employed in carrying out the method of fabrication.

With respect to the method of fabrication of an electrode directly to a crystal surface, an electrically conductive coating is applied to very high optically transmissive substrates (approximating 100 percent). The substrates containing the electrodes are positioned with respect to the surfaces of a crystal to which they are to be affixed. A globule of cement sufficient in size to provide a bonding layer of predetermined thickness is located between each of the electrodes and the corresponding crystal surfaces. Concurrently, the sandwich arrangement is held together for a predetermined period of time in room temperature ambient while it is subjected to a force applied to the unit being fabricated. The invention recognizes the existence of a relationship between the size of the crystal surfaces and the amount of force applied. The cement is cured and flattened between the electrodes and crystal surfaces to the predetermined thickness which is substantially totally transmissive to the light and satisfies the capacitance requirements for such a switch to permit high speed switching operation.

To assure that no gaps or air bubbles are present between the electrodes and crystal surfaces, the cement is an ionic carrier cement which effects the adhesion between the crystal surface and the electrode without chemically altering their mechanical and electrical properties. The cement is substantially 100 percent transparent in the visible light range and has a minimum specific resistance of ten times less than a $KD^*P$ crystal. The cement is formed of an acrylate base resin that is unbalanced by an ionic carrier epoxy resin in the presence of a catalyst.

DESCRIPTION OF THE PREFERRED EMBODIMENTS

Figure 1:
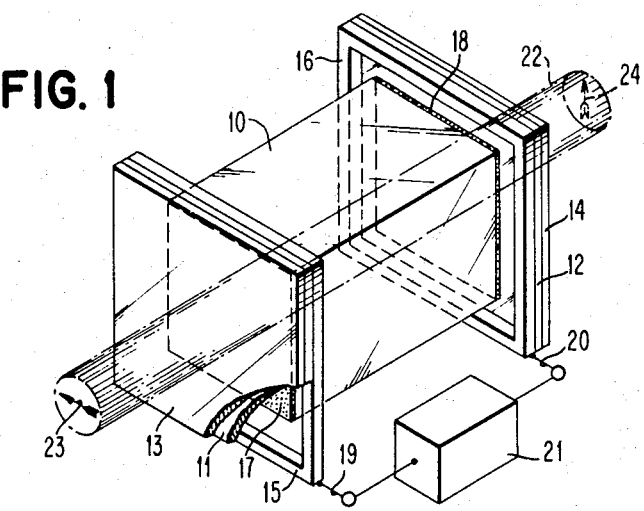
FIG. 1 is a perspective view partially in section of a fabricated electro-optic switch.

Referring now to FIG. 1, an electro-optic switch comprises an electro-optic crystal 10 such as a potassium dideuterium phosphate (KD*P) crystal. Electrodes 11 and 12 are affixed to substrates 13 and 14 and bonded to the end faces of crystal 10 by cement layers 17–18. Bus bars 15 and 16 are bonded to the periphery of each of the electrodes 11–12 for connection through conductors 19, 20 to a high voltage switching circuit.

When a beam of linearly polarized light such as 22 passes through crystal 10, the crystal acts to rotate the linear polarization state of this light dependent on whether drive circuit 21 is activated. If it is assumed that when the polarization state of beam 22 is horizontal as indicated by the arrow 23 and circuit 21 is not activated, the beam emerges from the opposite end of the switch at the substrate layer 14 without any change in the polarization state. On the other hand, if drive circuit 21 is activated applying the half wavelength voltage for the particular wavelength of light and the particular type of crystal employed, the beam emerging from surface 14 has a vertical polarization state as indicated by the arrow 24.

To assure that the level of optical transparency of the switch is high and that there is little attenuation of the light beam traversing it, it is necessary that electrodes 11–12 employed for connecting the switching voltage across crystal 10 have a high optical transparency. Electrodes 11 and 12 must also be good electrical conductors to accomplish the switching of voltage in the nanosecond range.

Figure 2:
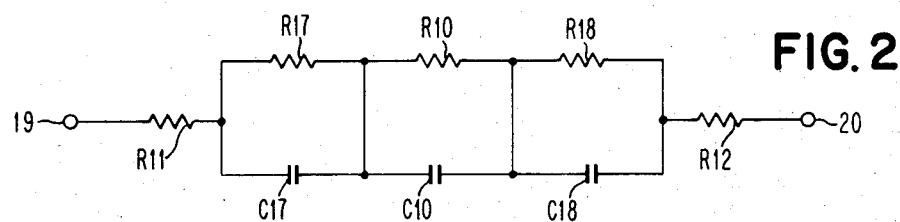
FIG. 2 is a schematic circuit diagram of the equivalent circuit of the switch of FIG. 1.

As is evident from FIG. 2, crystal 10 acts as a capacitance indicated as C10. The electrodes have resistances indicated as R11 and R12. It is necessary that the electrode resistances do not exceed electrical resistance values of 100 ohms. The connection between each of the electrodes and the corresponding surface of the crystal acts as a capacitor C17–C18 with some resistance R17–R18. Using ordinary optical cements, such as the low frequency cements for affixing the electrodes to the surfaces of a crystal increases the resistance of this connection and increases the resistive-capacitive time constant thereby reducing the passage of current from one electrode to the other.

By fabricating the electro-optic switch according to the method of this invention and by employing the cement of this invention, the resistive-capacitive characteristics of the connection between the crystal and the electrode are substantially minimized as the resistance of this connection is reduced. The resistivity of this connection is reduced by several orders of magnitude less than the resistivity of the KD*P crystal. In addition, the layer of cement between each of the electrodes and the corresponding surface of the crystal has a refractive index which nearly matches the indices of the electro-optic crystal. It is between the two indices of a refraction for a KD*P crystal for all of the wavelengths of visible light.

Figure 3:
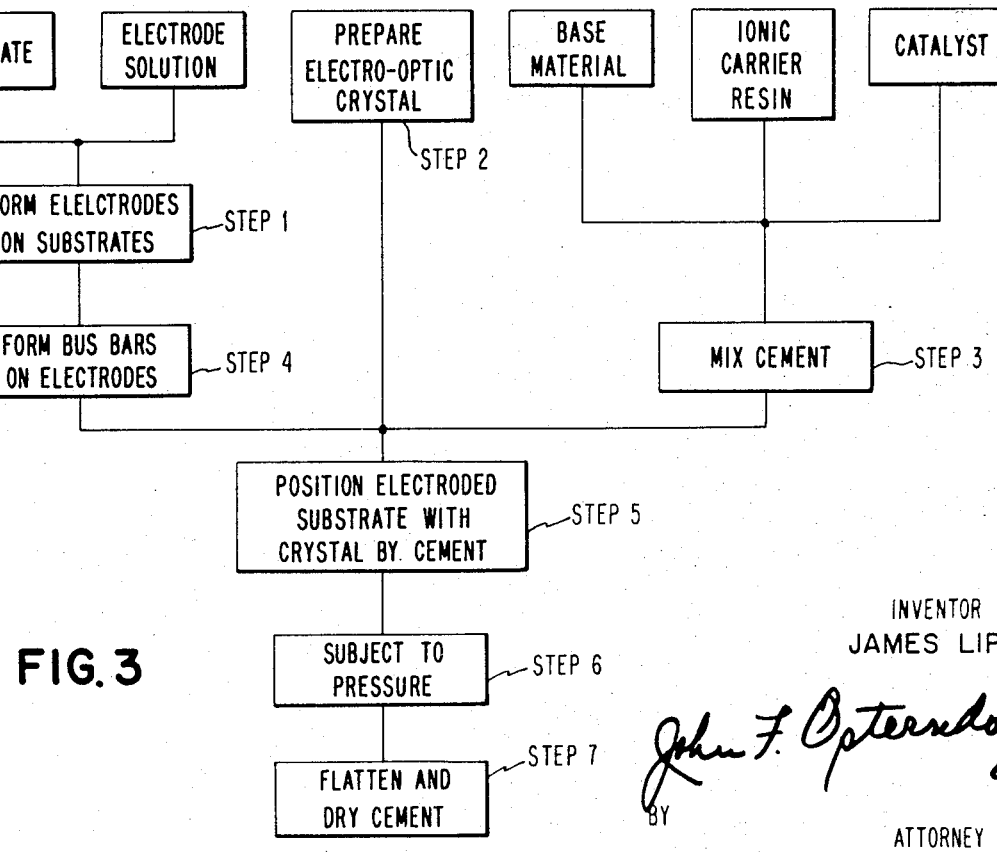
FIG. 3 is a block diagram showing the steps employed in the method of fabricating an electro-optic switch.

Referring now to FIG. 3, the method of the invention requires that an electrically conducting coating be applied to a substrate (Step 1). This process is known as NESA (Pittsburg Plate Glass Company) or EC coating (Corning Glass Works). An electrically conducting coating is achieved by spraying a solution formed as a mist on a quartz or other glass substrate to form an electrode. The solution is tin chloride ($SnCl_4$) and the spraying is performed at an elevated temperature in the range of 600° to 800°C. The ensuing reaction with oxygen under heat yields a coating which is primarily tin oxide ($SnO_2$). This film is bonded to the substrate and is mechanically tough and essentially chemically inert. If this solution is sprayed directly on the surface of an electro-optic crystal, the required properties for a switch are not obtained as the crystal is not capable of withstanding temperatures above 200°C. Low light transmissivity and high electrical resistance are obtained. Moreover, the electro-optic crystal such as a KD*P crystal cannot be subjected to such large temperature inversions without disintegrating.

The tin oxide electrode layer has a high optical transmissivity in the order of 98 to 99 percent and a low resistance of less than 100 ohms per square on application to the substrate and before it is affixed to the crystal surface. This enhances the resistive-capacitive characteristics of the switch and its speed of response.

Concurrently with the formation of the electrodes on substrates, electro-optic crystals are prepared and optically machined (Step 2). It has been found that the surfaces are acceptable if they do not depart from total flatness by more than four fringes of light at the sodium D line.

In Step 3, the cement used to affix the electrode-substrate structures to the surfaces of the crystal is mixed. As will be described more fully hereinafter, the cement consists of a base material, material, an ionic carrier resin and a catalyst. In performing the method of the invention, the cement is employed to fill the gap between each electrode surface and its corresponding crystal surface so as to provide adhesion of the crystal and electrodes while assuring proper electrical and mechanical properties.

In Step 4, bus bars may be formed on the electrodes for connection through 19, 20 to the source 21 of high voltage for effecting the switching of the crystal. One method of forming bus bars on the surfaces of electro-optic crystals is described in the IBM Technical Disclosure Bulletin, Aug. 1968, page 254. The bus bar is formed around the periphery of the electrode by using a photoresist over the electrode, selectively exposing the periphery by art work generation and then depositing a layer of metal around the periphery for the bus bar. Subsequently, the photoresist is removed by stripping from the electrode face.

In affixing the electrodes carried by the quartz or glass substrate to the surfaces of a crystal, two such electrodes are positioned (Step 5) with respect to the opposing surfaces of the crystal. A globule of cement is positioned between each electrode and its corresponding crystal surface and the entire unit in a sandwich form is subjected to pressure (Step 6). A weight is applied to one substrate while the other is held firm. The particular weight that is used and the size of the cement globule are related to the area of the crystal to be contacted by the cement.

Thus, if the total area of the surfaces to be affixed to electrodes is equal to four square centimeters, the weight should be in the range of 250 to 350 grams and the size of the cement globule should be one-half to three-fourths cm. in diameter. If the total area is 16 square centimeters, then the weight should be four times the above range and the cement globule size 2(½-¾) cm. in diameter, and if the total area is 32 square centimeters, the weight should be eight times the above range. Similarly, the size of the cement globule should have a diameter of 4(½-¾) cm. in diameter. Thus, when the contact area on the crystal surfaces in square centimeters is 4 × N the pressure should be exerted by a weight equal to N (250-350) grams and the diameter size of the cement globule should be N/2 (½-¾) cm, where N is a positive integer.

In step 6, the weight is applied for a period of six to 12 hours. Preferably, the weight is applied for a period approximating eight hours. The cement initially has a viscosity similar to water. After approximately one-half of this preferred period, the viscosity increases and the cement is partially cured (Step 7). During the remaining portion of the period, the cement continues to cure. During this period when the weight or pressure is applied, the globules of cement flatten out between the electrodes and the corresponding crystal surfaces. The method of fabricating the completed sandwich structure is performed at room temperature. Complete curing occurs during a 40-hour period after the weight is removed. If the weight is not removed after the twelve hour period, a strain results in the crystal. If such a strain results in the crystal or in the cement-to-crystal surface interface, it acts, when voltage is applied across the crystal, as a non-linear bias voltage. Compensation cannot be performed for such a voltage, due to these strains.

When the weight or pressure is removed, no stress is built into the crystal or the cement-crystal junction. The layer of cement has a thickness which is less than approximately 2 microns. As the maximum thickness of the cement does not exceed this value, the capacitive effects of the cement are minimized and a resistance value is obtained that is lower than the crystal resistance. This is the opposite of what is normally obtained when an ordinary optical cement is used to affix an electrode to a crystal surface. Usually, ordinary optical cements provide a resistance that is higher by an order of magnitude than the resistance of the crystal. The cement interface in this invention approximates 100% in light transmissivity, is flexible and resists deformation due to the Piezo electric effect when subjected to an electrical field. The cement does not chemically affect either the crystal or the electrode.

The prior art electro-optic switches are made with optical cements having a specific resistance greater than that of the crystal. This means, with reference to FIG. 2, that R17 and R18 are much greater than R10 and C17 and C18 are much greater than C10. Such crystal assemblies rely on the capacitive coupling of the cement layer to transmit voltage changes to the electro-optic crystal. Hence, they cannot be driven with direct current or high frequency signals.

As previously described, the cement consists of a base material, ionic carrier and catalyst. It is well known that the usual optical cement although reasonably transparent has a high dielectric constant. It exhibits low or no ionic conductivity and is not suitable for dc applications. When used to secure electrodes to an electro-optic crystal, it acts as a capacitor preventing current from flowing between the electrodes and across the crystal.

The optical cement of the invention has high optical transparency for light in the visible portion of the spectrum (approximating 100 percent) and at the same time has high ionic conductivity. An acrylate resin base material is unbalanced by an ionic carrier. The carrier is an epoxy resin derived from the condensation products of epichlorohydrin and glycerin. To speed up the curing process of the cement, a catalyst is also added.

Polymethyl methacrylate copolymer is a specific base material that may be unbalanced by the ionic carrier. It has a resistivity in the range of $10^{10} - 10^{12}$ ohm-centimeters, a dielectric constant at $10^6$ cycles of 2.8 - 3.3 and it has a specific gravity of 1.18 - 1.20. The resin has a repeating chemical structure that may be approximated by:

$$CH_2-C(CH_3)(COOCH_3)$$

A commercial resin of this type is HE79 of the Eastman Kodak Company.

The epoxy resin ionic carrier which is employed to unbalance the base material is an aliphatic epoxy resin and is composed of bi- and tri-epoxides, condensation products of epichlorohydrin and glycerin. The chemical structure for this resin as described at page 113 in the text Epoxy Resin Technology, edited by Paul F. Bruins, Interscience Publishers, is:

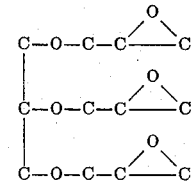

A typical carrier of this type is commercially obtainable from Shell Development Company as EPON 812.

EPON 812 resin has an epoxide functionality of 2.2 and contains approximately 10 percent by weight of tightly bound chlorine. Its epoxide equivalent, that is the grams of resin containing one gram equivalent of epoxide, is 150-170. This is as determined by ASTM D1652-59T. This resin has an approximate average molecular weight of 306 grams and an equivalent weight, that is the grams of resin required to esterify one mole of acid of 65. This resin is cured using an aliphatic amine curing agent which is fast curing and usable at room temperature or slightly elevated temperatures. It yields cured products of high strength and good chemical and solvent resistance. This particular type of resin is also called an epoxy plastic. It has superior adhesion to metals and glass and during the curing process shows limited shrinkage.

The catalyst which speeds up the curing process may be methyl ethyl ketone peroxide having a chemical formula as follows:

$$CH_3COC_2H_5$$

The constituents of the cement are combined in a ratio of 100 for the base material, 11 for the ionic carrier and 4 for the catalyst. In percentages by weight of the total weight, the base material is preferably in the range of 81 to 87 percent, the ionic carrier 10 to 14 percent, and the catalyst 3 to 5 percent.

While this invention has been particularly described with reference to the preferred embodiment thereof, it will be understood by those skilled in the art that the foregoing and other changes in form and details may be made therein without departing from the spirit and scope of the invention.

What is claimed is:

1. In a method of fabricating an electro-optic switch, comprising the steps of positioning electrode-substrate structures in sandwich form with respect to opposing surfaces of an electro-optical crystal, depositing a globule of a viscous high ionic conductivity substantially totally transmissive optical cement having a minimum specific resistance less than that of the crystal between each electrode and its corresponding crystal face, the size of the globule of cement having the relationship of N/2 (½ to ¾) centimeter to a crystal surface area of 4 × N square centimeters to be affixed to the electrodes, where N is a positive integer, subjecting the sandwich to pressure the flatten the cement between the respective electrodes and crystal surfaces, the amount of pressure applied to the sandwich having a predetermined relationship to the crystal surface area to be affixed to the electrodes, and simultaneously curing the cement by drying it in a substantially room temperature ambient for a predetermined period of time.

2. In the method of claim 1, including the forming of a bus bar around the periphery of the electrode prior to the positioning of the structure in sandwich form.

3. In the method of claim 1, wherein the sandwich is subjected to pressure by supporting one side of said sandwich and applying a weight to the other side of said sandwich, the applied weight having the relationship of N (250–350) grams for 4 × N square centimeters of crystal surface contact area, wherein N is a positive integer.

4. In the method of claim 3, wherein curing while subjecting the sandwich to pressure is performed for the period of time of 6 to 12 hours.

5. A method of fabricating an electro-optic switch, comprising the steps of spraying an electrically conductive coating as a mist on substrates to form electrode-substrate structures, forming bus bars around the periphery of each of the electrodes, positioning the electrode-substrate structures with formed bus bars in sandwich form with opposing surfaces of an electro-optical crystal, depositing a globule of a viscous high ionic conductivity substantially totally transmissive optical cement having a minimum specific resistance less than that of the crystal between each electrode and its corresponding crystal face, applying a weight to one face of the sandwich and holding the opposing face rigid to flatten the cement between the electrodes and crystal surfaces, the weight having a predetermined relationship in size to the crystal surface area to be affixed to the electrodes, and simultaneously curing the cement by drying it in a substantially room temperature ambient for a predetermined period of time.

6. The method of claim 5, wherein the specific resistance of the cement is at least ten times less than that of the crystal.

7. The method of claim 5, wherein the globule of cement has the relationship of N/2 (½ to ¾) centimeters in size to the crystal surface area of 4 × N square centimeters to be affixed to the electrodes, where N is a positive integer.

8. The method of claim 7, wherein the weight applied to one face of the sandwich has the relationship of N (250–350) grams for 4 × N square centimeters of crystal surface contact area.

* * * * *